Patented Aug. 24, 1943

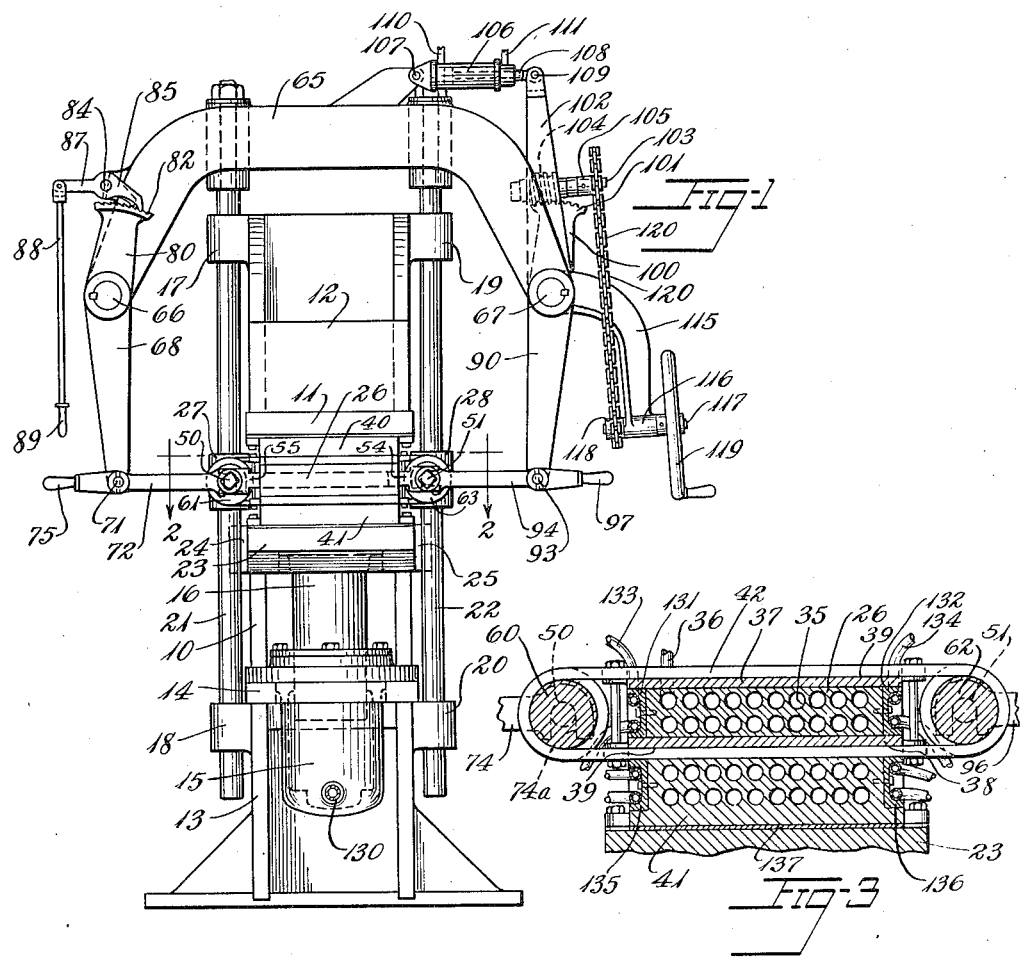
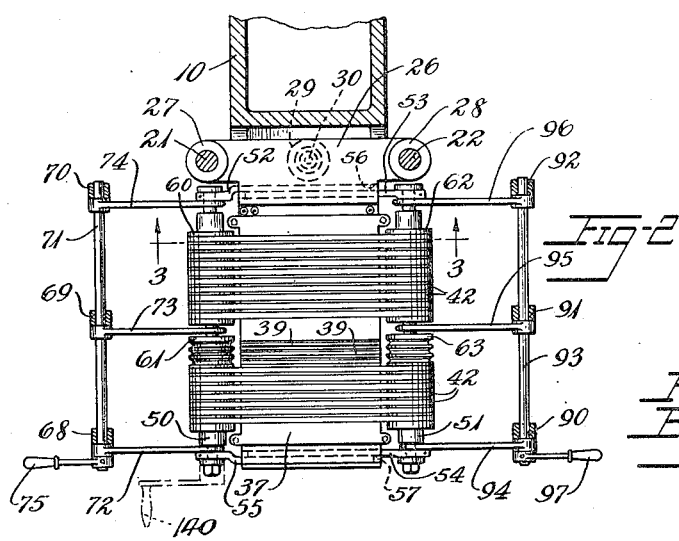

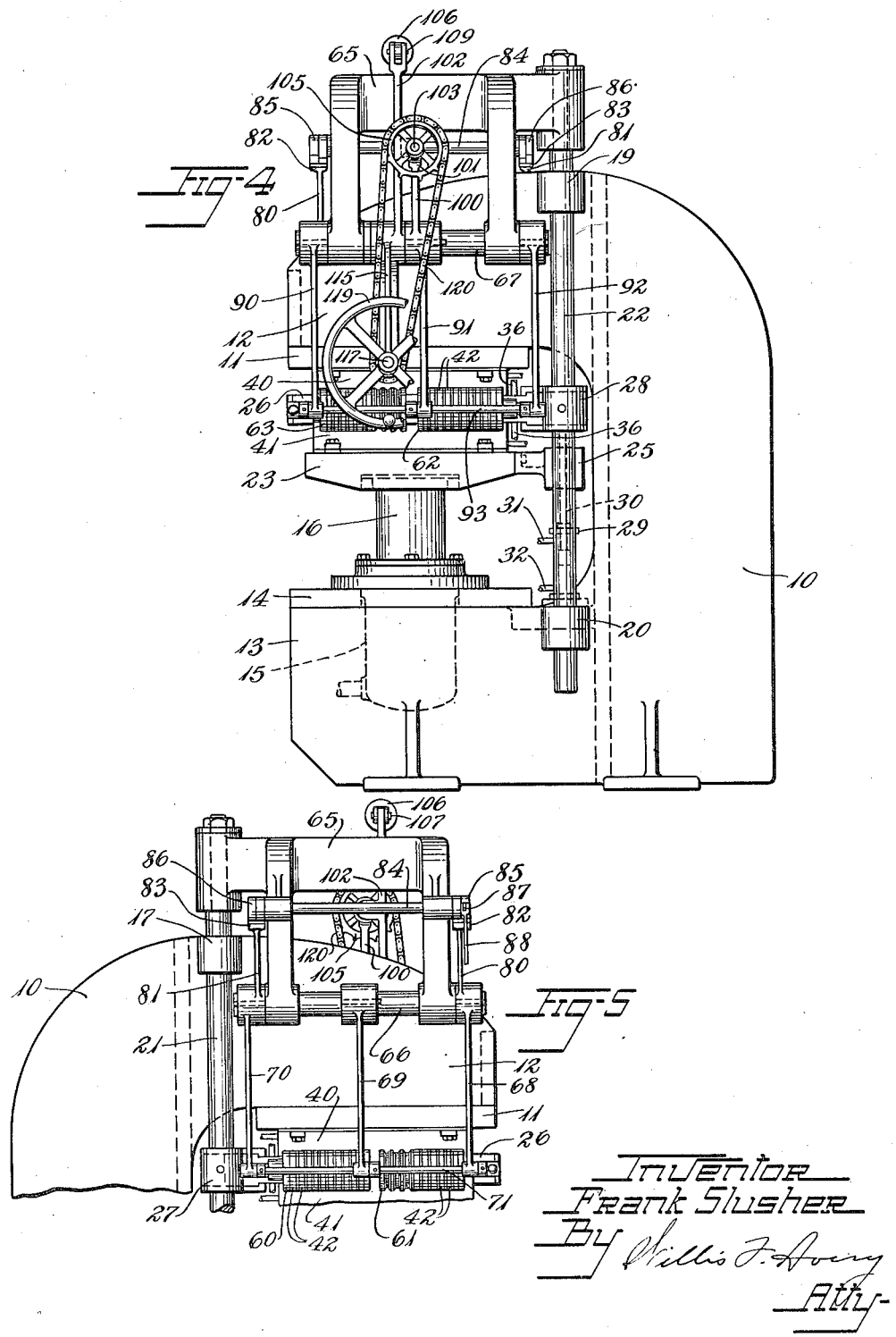

2,327,566

UNITED STATES PATENT OFFICE 2,327,566

APPARATUS FOR VULCANIZING ENDLESS BELTS

Frank Slusher, Akron, Ohio, assignor to The B. F. Goodrich Company, New York, N. Y., a corporation of New York Application May 6, 1941, Serial No. 392,066

6 Claims. (Cl. 18—17)

This invention relates to apparatus for vulcanizing endless belts and the like, and is especially useful in the manufacture of endless belts of trapezoidal cross-section for multiple belt drives.

In the manufacture of transmission belts of trapezoidal cross-section, commonly known as V-belts, it is important to provide belts having the same length and other physical characteristics so that where such belts are used in multiple the load will be uniformly distributed between the individual belts.

The present invention aims to provide endless belts of uniform length and stretch characteristics.

The principal objects of the present invention are to provide for vulcanizing a plurality of endless belts simultaneously under the same conditions of tension, temperature, and pressure, to provide conveniently for adjustment as to length of the belts, to provide step-by-step vulcanization without release of tension on the belts, to provide for quick loading and unloading of the apparatus, to provide for quick application and removal of tension, and to provide for quick adjustment of the belts from cure to cure.

These and other objects will appear from the following description and the accompanying drawings.

Of the drawings:

Fig. 1 is a front elevation of a vulcanizing apparatus embodying the invention.

Fig. 2 is a sectional view thereof taken on line 2—2 of Fig. 1.

Fig. 3 is a sectional detail view taken on line 3—3 of Fig. 2.

Fig. 4 is a side elevation of the apparatus, parts being broken away, showing the apparatus as viewed from the right of Fig. 1.

Fig. 5 is an elevation of the upper part of the apparatus as seen from the opposite side, parts being broken away.

In accordance with the invention, a vulcanizing press is provided with a platen having molding surfaces on opposite faces thereof and means are provided for supporting the belts over pulleys at opposite ends of the platen, for adjusting the center distance of the pulleys to provide uniform tension to the belts, for quickly releasing and applying tension, and for applying vulcanizing heat and pressure. The invention also provides for loading and unloading without obstruction for individual movement of the belt supporting platen, for cooling the ends of the curing platen, for rotation of the pulleys to step a plurality of belts ahead simultaneously to effect a uniform step-by-step cure, and for adjustment of the belt supporting pulleys in a direction parallel to the face of the molding platen.

Referring to the embodiment of the invention shown in the drawings, the numeral 10 designates a rigid frame of C-shape which has a fixed platen 11 supported by its upper jaw 12. The lower jaw 13 thereof has a bolster plate 14 which supports a vertical ram cylinder 15. A ram 16 is slidably fitted in the cylinder for vertical movement. The frame 10 has ears 17, 18, 19, 20 fixed thereto and adapted to guide a pair of vertical guide rods 21, 22 which are slidably fitted through apertures therethrough. A movable platen 23 is supported by the ram 16 and has guide ears 24, 25 which are fitted to slide along the guide rods. A second movable platen 26 is located between the platens 11 and 23 and is formed with ears 27, 28 which are pinned to the guide rods 21, 22 respectively. A double-acting fluid pressure cylinder 29 is mounted on the frame 10 and its piston rod 30 slides vertically and has its upper end fixed to the platen 26. The cylinder has ports 31, 32 connected through a suitable reversing valve with a source of pressure (not shown) so that it is effective to move the platen 26 up and down independently of movement of the ram 16.

Platen 26 is cored as at 35 for circulation of steam for curing purposes, the steam being supplied from any convenient source (not shown) through flexible pipe connections 36. Mold plates 37, 38 with grooves 39, 39 of trapezoidal section are fixed to the top and bottom surfaces respectively of the platen 26 with their belt-receiving grooves 39, 39 cross-wise of the press and facing upwardly and downwardly respectively for cooperating with heated mold plates 40, 41 fixed to the platens 11 and 23 for molding simultaneously upper and lower reaches of belts 42 looped about the platen 26.

For supporting the loops of the belts, horizontally disposed shafts 50, 51 are rotatably mounted at the ends of the platen 26 in bearings formed on rods 52, 53, 54, 55 (see Fig. 2) slidably mounted for horizontal movement in guideways 56, 57 formed at the back and front margins of the platen 26. Grooved idler rollers 60, 61, 62, 63 are fixed to the shafts 50, 51 with their grooves aligned with the grooves of the mold plates. The arrangement is such that the shafts 50, 51 may be moved toward and away from each other in a horizontal direction with their grooves which support the belts in alignment with the grooves of the molds.

For controlling the shafts 50, 51 to stretch the belts, a yoke 65 is fixed to the upper ends of the guide rods 21, 22 and a pair of horizontally disposed shafts 66, 67 are rotatably mounted in bearings formed in the ends of the yoke on axes parallel to shafts 50, 51. Lever arms 68, 69 and 70 are fixed to shaft 66 and depend therefrom. They have aligned bearing apertures at their lower ends through which a shaft 71 extends. Lever arms 72, 73, 74 are fixed to shaft 71 and have downwardly opening slots, such as 74a (see Fig. 3) in their free ends adapted to engage over shaft 50. A handle 75 is provided to rotate shaft 71 to connect or disconnect the lever arms 72, 73, 74 to and from the shaft 50. Upwardly extending arms 80, 81 are formed integral with arms 68 and 70 respectively and have arcuate ratchet toothed portions 82, 83 at their upper ends. A horizontal shaft 84 is journaled in the yoke 65 and has a pair of pawls 85, 86 fixed thereto and adapted to engage the ratchet teeth. Ratchet pawl 85 has an arm 87 integral therewith, to which a rod 88 is pivoted. A handle 89 on rod 88 may be used to lift the pawls from the ratchets to permit levers 68, 69, 70 to be swung toward and from the platen 26 and the pawls normally engage the ratchets of their own weight and prevent swing of the levers toward the platen.

Shaft 67 also has three dependent lever arms 90, 91, 92 fixed thereto which support a horizontal shaft 93 journaled therein which has arms 94, 95, 96 fixed thereto notched to engage over shaft 51 and to be swung free by a handle 97 in similar fashion.

An upwardly extending arm 100 is formed integral with arm 91 and has an arcuate worm-toothed rack surface 101. A lever arm 102 is rotatably mounted on shaft 67 and has a bearing formed on it to rotatably engage a worm shaft 103 having a worm 104 fixed thereto and adapted to engage the rack surface 101. A sprocket wheel 105 is also fixed to shaft 103. A double-acting pressure cylinder 106 is pivoted at 107 to the yoke 65 and its piston rod 108 is pivoted at 109 to the free end of arm 102. Fluid under pressure is supplied to the cylinder 106 through ports 110, 111 from any convenient source (not shown) through a suitable reversing valve (not shown). The arrangement is such that when the arms 72, 73, 74, 94, 95, 96 are hooked over shafts 50, 51 as shown in Fig. 1, and port 111 is connected to a source of pressure and port 110 is permitted to exhaust. Shafts 50, 51 are thereby moved apart an amount permitted by the travel of the piston rod 108 and when port 110 is under pressure and port 111 is in exhaust, the shafts are moved closer together releasing tension on the belts.

An arm 115 is made integral with arm 102 and provides a bearing 116 for a shaft 117 journaled therein. A sprocket 118 and a hand wheel 119 are fixed to shaft 117. A chain 120 connects sprockets 105 and 118. By rotation of hand wheel 119 the relation of arms 100 and 102 may be adjusted angularly thereby changing the limit position of shaft 51 in its outward movement whereas the adjustment of arm 68 to adjust shaft 50 is controlled by the ratchet adjustment. The arrangement is such that shaft 50 may be primarily adjusted, shaft 51 moved to its outermost position by cylinder 106 and then hand wheel 119 may be adjusted until the shafts are at the correct center distance for the desired stretch.

Hydraulic pressure is supplied to ram cylinder 15 through a pipe 130 from any convenient source and control valve (not shown). The ram 16 may be used to lift not only the platen 23 and its mold plate 41 but also upon contact therewith will lift the platen 26 and its belt-stretching mechanism when desired, although the platen 26 and its belt-stretching mechanism may be moved independently by the cylinder 29. In making step-by-step cures, it is advisable to use cold-end molds and the platen 26 is provided with extensions 131, 132, having cooling coils 133, 134 through which cold water may be circulated to cool the ends of the molds. In similar manner, cooling extensions 135, 136 are provided on the platen-supported mold 41 and like provision is made on mold 40. All of the cooling coils are supplied through flexible connections permitting movement of the mold members. The heated molds are separated from the platens, as at 137 by layers of heat-insulation.

The operation of the apparatus is as follows: With the press closed, the pipe 130 is connected to the drain and platen 23 is lowered by its own weight. Platen 26 is then lowered by draining cylinder 29 through pipe 32. Contact of the yoke 65 with ears 17, 19 limits the downward movement of platen 26 and the stretching mechanism. The press is now open. By depressing handles 75 and 97, the shafts 50, 51 are disconnected from the stretching mechanism. Arm 68 may be swung outwardly by releasing the pawl 85 and arm 90 may be swung outwardly by pressure applied to cylinder 106 through pipe 111. Handles 75 and 97 may then be raised and their connected arms 72 and 94 will be swung clear of the middle platen 26. Shafts 50, 51 may be pushed toward the platen and the belts removed and new belts placed about the platen, the open-side form of the press and the release of the tension roll shafts permitting free passing of endless belts over the platen 26.

Where the next batch of belts are of the same length as the ones previously cured, no adjustment of hand wheel 119 is necessary. The press is closed by admitting hydraulic pressure to cylinder 15 after the belts have been tensioned around the platen by pressure admitted to cylinder 106 through pipe 111, the pawl 85 having been returned to the same notch of the ratchet 82 and the arms 72, 94 having been hooked over shafts 50, 51.

Where the next batch of belts are of different length than the ones previously cured, adjustment is made by use of hand wheel 119 or if necessary by shifting the position of arm 80 with respect to the pawl 85 and then adjusting the hand wheel with the piston rod 108 in its outermost position to set shafts 50, 51 at the correct center distance.

After a cure, the press is opened and the position of the belts shifted to cure a new reach thereof. To accomplish this a crank 140 may be employed, the ends of the shafts 50, 51 being squared to receive a square socket of the crank.

Variations may be made without departing from the scope of the invention as it is defined by the following claims.

I claim:

1. Apparatus for vulcanizing endless belts comprising a movable platen and a stationary platen, pulleys supported at the ends of the movable platen for supporting a plurality of endless belts about said movable platen, means for moving said pulleys with relation to each other for belt-tensioning, one of said platens having parallel spaced-apart molding grooves in a face thereof for receiving a plurality of belts of the same length, and said pulleys having grooves disposed in the faces thereof, and means on said last mentioned platen for guiding said pulleys in their tensioning movements in constant alignment of their grooves with said molding grooves for supporting a plurality of belts under uniform tension.

2. Apparatus for vulcanizing endless belts comprising a movable platen and a stationary platen, pulleys supported at the ends of the movable platen for supporting an endless belt about said movable platen, means for moving said pulleys with relation to each other for belt-tensioning comprising a support secured to said movable platen for movement therewith, and means hinged thereto for engaging said pulleys to move the same for simultaneously applying tension to a plurality of belts thereon.

3. Apparatus for vulcanizing endless belts comprising a movable platen and a stationary platen, pulleys supported at the ends of the movable platen for supporting an endless belt about said movable platen, means for engaging said pulleys and moving them with relation to each other for belt-tensioning comprising a support secured to said movable platen for movement therewith, and means hinged thereto for engaging said pulleys to move the same for simultaneously applying tension to a plurality of belts thereon, said tensioning means comprising pulley-engaging elements adjustable with said support and detachably engageable with said pulleys.

4. Apparatus for vulcanizing endless belts comprising a movable platen and a stationary platen, pulleys supported at the ends of the movable platen for supporting an endless belt about said movable platen, means for engaging said pulleys and moving them with relation to each other for tensioning a belt, said means comprising a support secured to said movable platen for movement therewith, and means hinged thereto at opposite sides of the press for engaging said pulleys to move the same for simultaneously applying tension to a plurality of belts thereon, the hinged means comprising pulley-engaging elements at the opposite sides of the press adjustable independently of each other.

5. Apparatus for vulcanizing endless belts comprising an upper fixed platen, a lower movable platen, an intermediate movable platen therebetween defining with said upper and lower platens sets of parallel belt-holding grooves, means for opening and closing said press, grooved pulleys carried by the intermediate platen and movable toward and from said platen in alignment with said molding grooves, means for independently elevating and lowering said intermediate platen with respect to said lower platen, and tensioning means supported by said elevating means for engaging said grooved pulleys for tensioning belts surrounding said pulleys and said intermediate platen, said tensioning means having dependent tensioning arms engageable with said pulleys for tensioning purposes and disengageable therefrom for permitting loading and unloading of endless belts.

6. Apparatus for vulcanizing endless belts, said apparatus comprising a movable platen, a stationary platen, belt supporting pulleys at the ends of one of said platens, and means for moving said pulleys with relation to each other for belt-tensioning, at least one of said platens having a plurality of parallel spaced-apart grooves in a face thereof for receiving a plurality of belts, said means for moving the pulleys being supported from said movable platen for movement therewith, and said pulleys having spaced-apart circumferential grooves in alignment with the platen grooves for simultaneously supporting a plurality of endless belts under uniform tension and in alignment with the platen grooves.

FRANK SLUSHER.